March 12, 1940. SAMU-EL ISH-SHALOM 2,193,002
CONVERTIBLE MIXING APPARATUS
Filed Sept. 7, 1939 5 Sheets-Sheet 1

INVENTOR
SAMU-EL ISH-SHALOM
BY
ATTORNEY

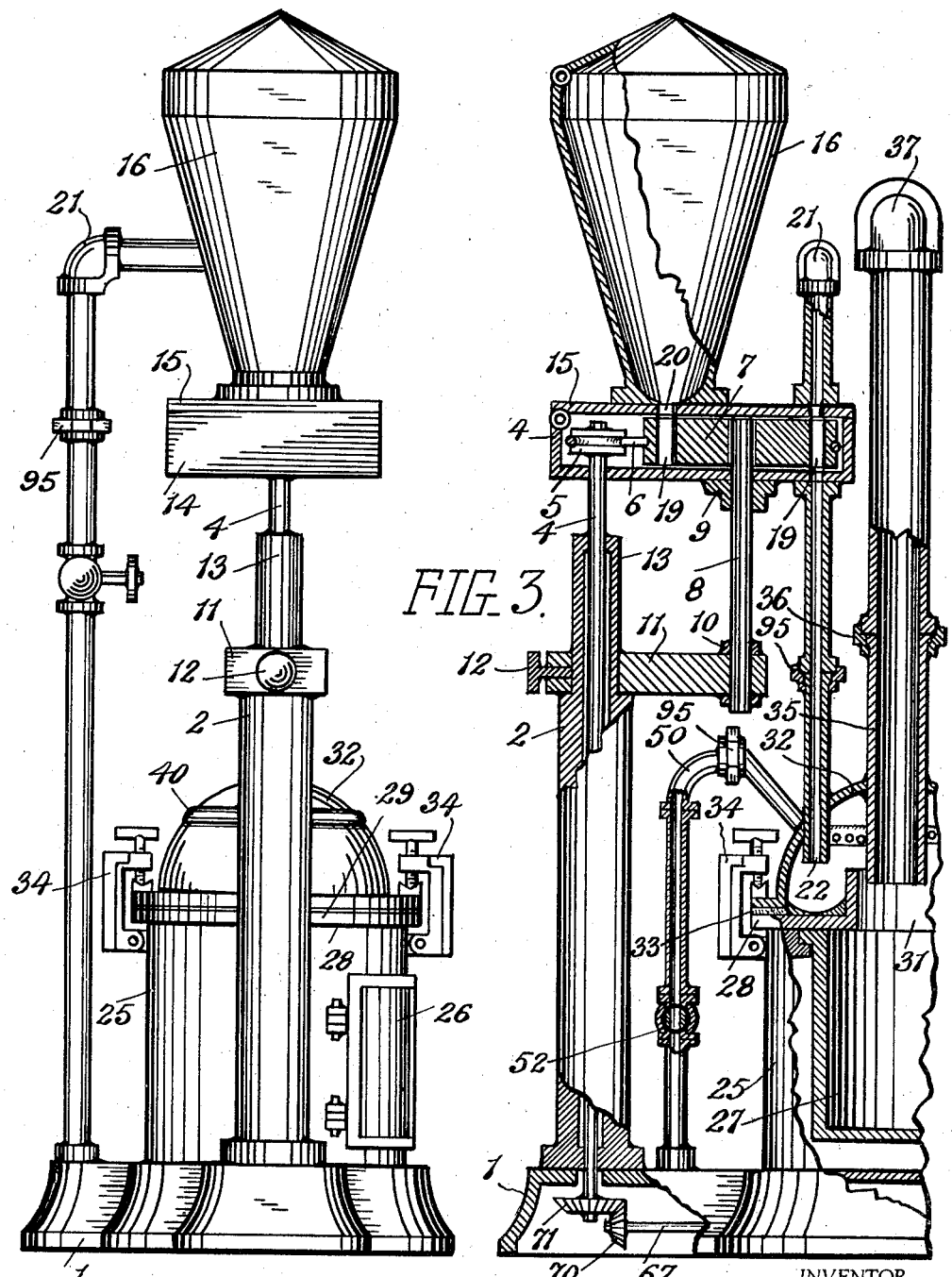

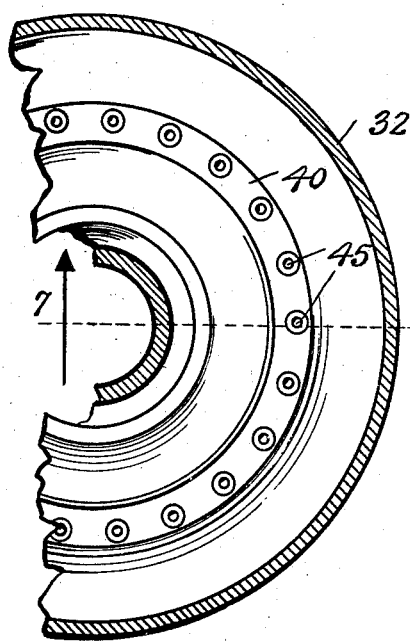
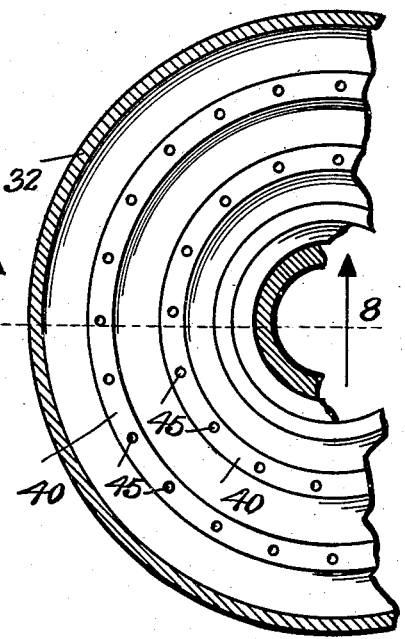
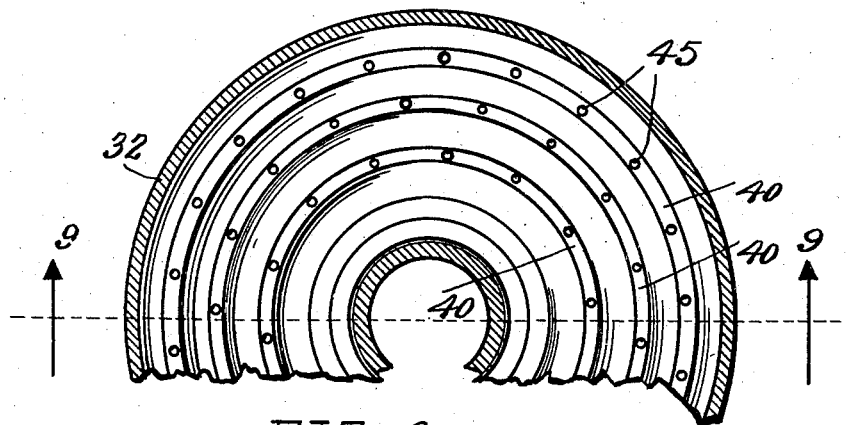

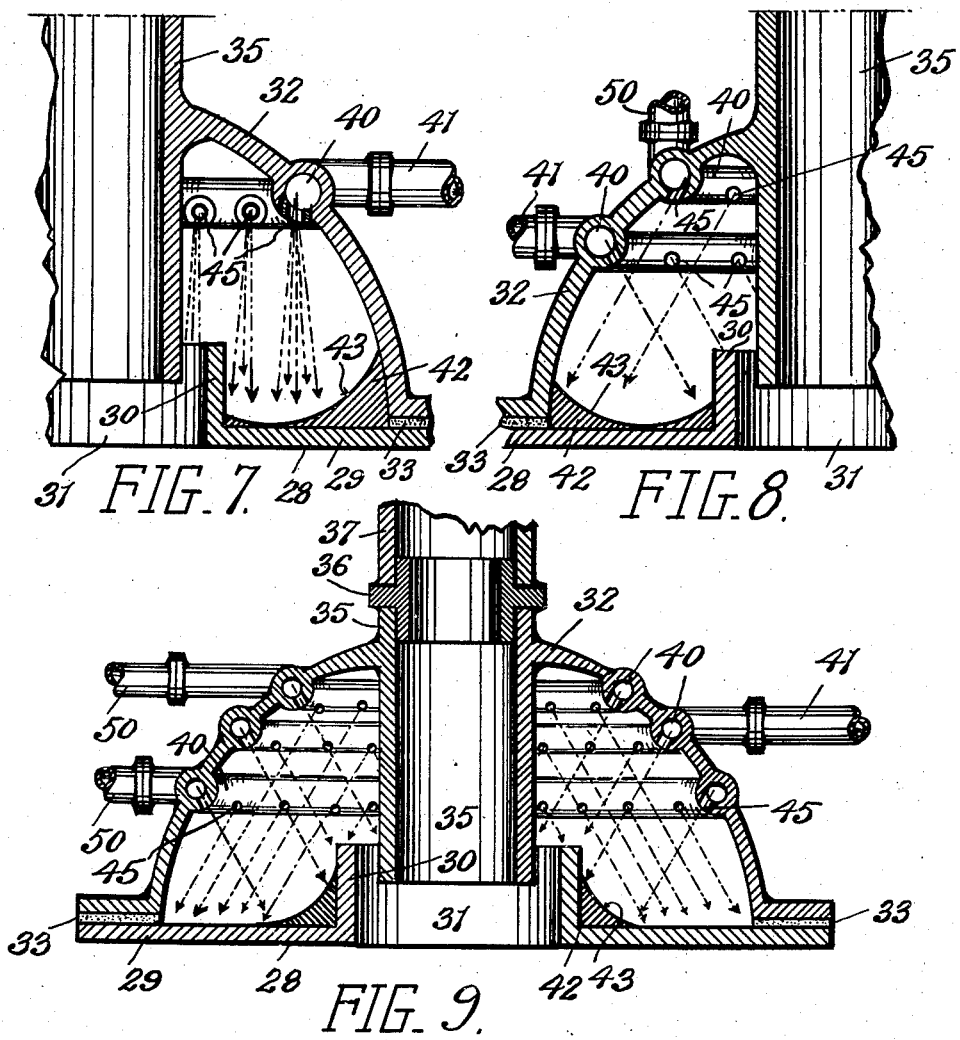

March 12, 1940.   SAMU-EL ISH-SHALOM   2,193,002
CONVERTIBLE MIXING APPARATUS
Filed Sept. 7, 1939    5 Sheets—Sheet 5

INVENTOR.
SAMU-EL ISH-SHALOM
BY Harry Radzwisky
ATTORNEY.

Patented Mar. 12, 1940

2,193,002

UNITED STATES PATENT OFFICE 2,193,002

CONVERTIBLE MIXING APPARATUS

Samu-El Ish-Shalom, Brooklyn, N. Y.

Application September 7, 1939, Serial No. 293,757

9 Claims. (Cl. 259—4)

This invention relates to means for mixing finely divided or powdered materials, such as those used in the manufacture of cosmetics, and is primarily intended to be used for mixing powdered base materials and coloring matter or pigments in a stream of purified air or other gas moving at a great speed and under great compressional energy.

One of the primary objects of the invention is to provide a novel form of mixing chamber in which the materials to be mixed are whirled by air streams of air under pressure; in which the direction of flow of the air streams may be controlled according to mixing requirements.

Another object of the invention is to provide means by which dome-shaped tops for the mixing chamber may be interchangeably used to provide selected flow of the air streams. Another object of the invention is to provide means by which pocketing of the material mixed in corners of the mixing chamber will be avoided. Another object also of the invention is to provide valve control means by which regulation of the air flow is controlled according to mixing requirements.

These and other objects are accomplished by the invention, a more particular description of which will appear hereinafter and be set forth in the annexed claims.

Figure 1:
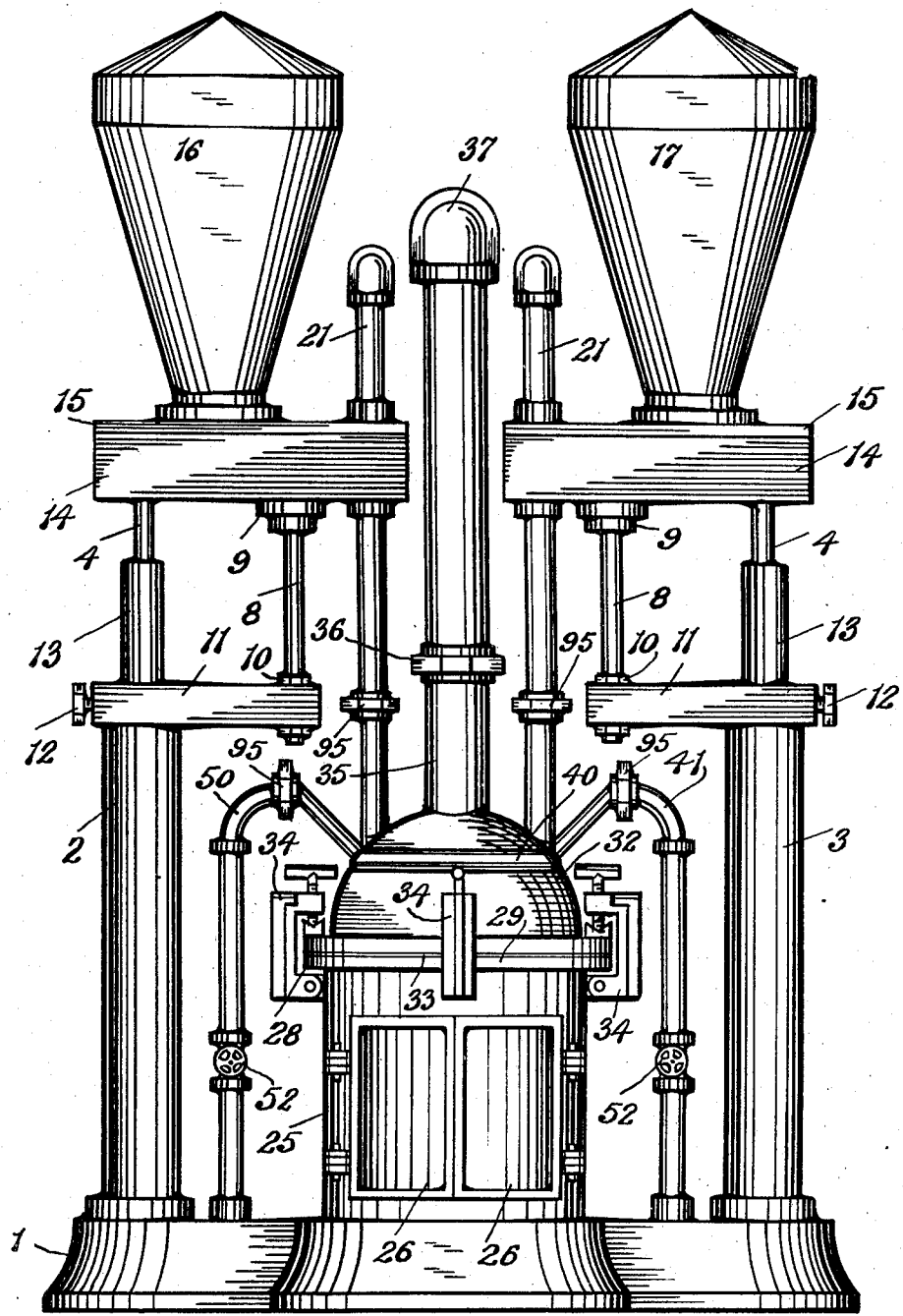
Figure 10:
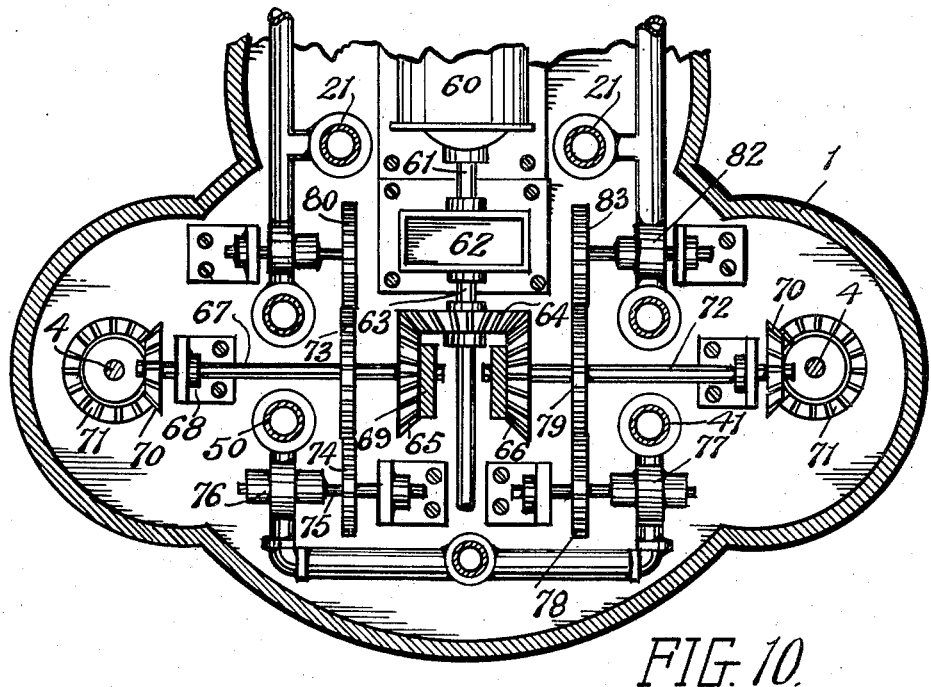
Figure 11:
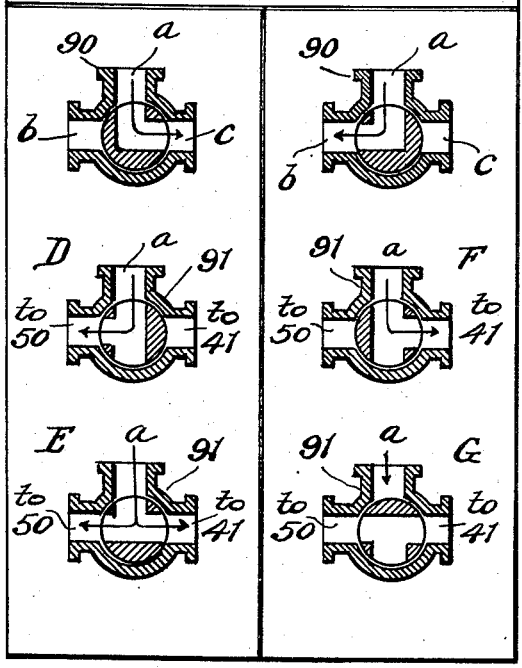

In the accompanying drawings, forming a part hereof, Fig. 1 is a front view of a mixing machine constructed in accordance with the invention; Fig. 2 is a side elevation of the same; Fig. 3 is a view at right angles to that of Fig. 2, with parts shown in section, to disclose construction; Figs. 4 to 6 inclusive, are views of the underside of several types of domes which may be selectively employed to form the upper part of a mixing chamber; Fig. 7 is a sectional view on the line 7—7 of Fig. 4, looking in the direction of the arrows; Fig. 8 is a sectional view on the line 8—8 of Fig. 5, looking in the direction of the arrows; Fig. 9 is a sectional view on the line 9—9 of Fig. 6, looking in the direction of the arrows; Fig. 10 is a plan view, with parts in section of the valve operating mechanism, and Fig. 11 is a chart diagrammatically showing suggested valve operation.

With reference to Figs. 1 to 3 of the drawings, 1 indicates the base of the machine, the same being preferably made hollow to constitute a housing for the valve-operating mechanism shown in detail in Fig. 10. Rising vertically from the base 1 is a pair of similar hollow posts 2 and 3, each of which constitutes a bearing for a vertical rotative shaft 4 which is driven by the mechanism shown in Fig. 10, to be more particularly described. At its upper end each shaft 4 carries a pulley 5 (Fig. 3) around which a belt 6 extends, said belt also extending around the grooved periphery of a feed disc 7. Disc 7 is rotatable on a vertical shaft 8 in the supports 9 and 10, the support 10 being carried at the end of an arm 11 adjustably secured by set screw 12 on the reduced upper end 13 of the post 2 or 3.

A casing 14 encloses the upper ends of shafts 4 and 8 as well as the pulley 5, belt 6 and feed disc 7 as will be apparent from Fig. 3. The hinged top 15 of casing 14 supports one of the hoppers, the two hoppers employed in the machine being shown at 16 and 17 in the drawings. The feed disc 7 is provided with a plurality of apertures 19 extending through it, each of said apertures being adapted, during rotation of the disc, to register with the outlet opening 20 of the hopper and when filled with some of the material therefrom to be thereafter moved into registration with an air supply pipe 21. Air under pressure is directed from a suitable source and is forced through the pipe 21 so that the compressed air forces the material located in the aperture 19 then below the pipe 21 downwardly through the lower portion of the pipe, the outlet end 22 of which is located within the mixing chamber. From the foregoing description, it will be apparent that as the disc 7 is rotated, the material falling into the apertures 19 from the hopper disposed above said apertures will be carried around to a position below pipe 21 and forced by air passing therethrough down through the lower portion of said pipe into the mixing chamber. The description just given of one of the feed mechanisms applies to both, as the same are similar in all respects.

Rising from the base 1 is a cylindrical housing 25, provided at the front with hinged doors 26 through which access is afforded to a collection receptacle 27 into which the mixed material falls. Resting on the top of the housing 25 is the base portion 28 of the mixing chamber, said base portion having a horizontally disposed flange 29 and a vertically disposed cylindrical wall 30, the wall 30 forming a central opening 31 in the portion 28 through which the mixed material falls to reach the collection receptacle 27 disposed below the opening 31. Seated on flange 29 of the mixing chamber base member 28 is a dome 32, said dome and the base member 28 forming the mixing chamber. A gasket 33 is interposed between the peripheral flange on the dome and flange 29 to insure an air-tight joint therebetween, and spaced clamps 34 to hold the dome securely, yet removably, in position on the base member 28.

The construction of the dome employed as the top of the mixing chamber may vary as will be presently explained, and as will be apparent from Figs. 7 to 9 inclusive. Each dome, however, is provided with a centrally located vertical outlet sleeve 35 of less diameter than the outlet opening 31, the lower end of said sleeve 35 being disposed within said opening 31 as will be clear from Figs. 3 and 7 to 9 inclusive. The upper end of sleeve 35 is connected by a suitable coupling such as shown at 36 to air exhaust pipe 37 through which the air passes after having whirled the material about in the mixing chamber and mixed the same.

The dome which forms the upper portion of the mixing chamber, may be constructed according to various requirements, one dome being easily placed in position in substitution for another. For example, in Fig. 7 the dome is formed with a single annular air passage 40 connected to an air supply tube 41 or a branch thereof through which air under pressure from a suitable source is forced. Passage 40 is formed with a plurality of spaced downwardly directed holes 45 through which the air under pressure is forced so that the streams of air so directed, as shown in dotted arrow lines in Fig. 7, will be directed toward the bottom of the mixing chamber, said bottom shown at 42, having its upper face transversely curved as at 43 so that none of the material being swirled about in the chamber by the air streams can lodge in corners of the mixing receptacle. Variations in the form of curvature of the bottom of the mixing chamber will be seen in Figs. 8 and 9.

In Fig. 8, the dome shown is formed with two annular passages 40, the same being disposed in parallel, with one located above the other, the holes 45 in one of the passages being disposed angularly with respect to the holes in the second passage so that the air streams directed through the two sets of holes will be delivered downwardly but in opposite directions to cross one another as indicated in dotted arrow lines in Fig. 8.

In Fig. 9 another modification is shown wherein the dome is formed with three superposed passages 40 through which the air is forced, each passage having its outlet holes angularly disposed to cross the air streams emanating from the several groups of holes as indicated in dotted arrow lines. The number of annular passages in each dome may be varied as required and by the simple substitution of one dome for another, mixing requirements of different materials may be regulated to secure maximum efficiency in the mixing operation.

In Fig. 1 of the drawings are shown two air supply pipes 41 and 50, connecting to annular passages 40 in the dome. When a dome utilizing only one annular passage is employed, so that only one of the air pipes 41 or 50 is connected to the passage, the other of the air pipes may be shut off by the use of manually operated valve 52. In the valve-operating mechanism shown in Fig. 10 provision is made for the automatic operation of valves for the air-supply tubes, and the number of air-supply tubes leading into the mixing chamber may be increased by the provision of as many branches as are needed leading from the main air supply pipes.

In Fig. 10, an electric motor 60 has its shaft 61 connected to a reduction gearing 62 provided with shaft 63 on which is secured the beveled gear 64 which meshes with the beveled gears 65 and 66. Gear 65 is secured on shaft 67, mounted in bearings 68 and 69 and carries beveled gear 70 which drives a beveled gear 71 secured on the lower end of one of the vertical shafts 4. The second shaft 4 is driven in a similar manner from shaft 72 on which beveled gear 66 is mounted.

Shaft 67 carries a gear 73 which drives gear 74 on shaft 75, the shaft 75 constituting operating member of valve 76 that controls the flow of air under pressure from a suitable source to one or both of air pipes 41 and 50. Valve 77 is similarly controlled by gear 78 driven from gear 79 on shaft 72. Another gear 80 driven by gear 73 controls the operation of a valve 81 in air line leading to one of the air pipes 21, while valve 82 in air line leading to other pipe 21 is operated by gear 83 driven by gear 79. Since the arrangement of air feed pipes and the valves controlling the flow of air therethrough is largely dependent upon the number of annular passages employed in the domes selectively used as part of the mixing chamber, no effort is herein made to disclose in detail any specific arrangement of piping composed in whole or in part of flexible tubing applicable in all cases of domes construction. Couplings 95 on the various pipes serve to facilitate connection of the dome to the pipes.

A desirable arrangement of valve operation is however, disclosed in the chart shown in Fig. 11. There, the valve 90 is intended to diagrammatically indicate the valve or series of valves which control the flow of air through both air pipes 21 feeding the material from the hoppers 16 and 17. The inlet $a$ of the valve is connected to a source of air under pressure. Outlet $b$ of the valve is connected to one of the pipes 21 and the outlet $c$ to the other pipe 21. Thus in the position shown at the left in Fig. 11 air is being forced from outlet $c$ through one of the air pipes 21 so that material from one of the hoppers is being directed from that pipe into the mixing chamber. As the valve is rotated it directs the air flow through outlet $b$, shutting off the flow through outlet $c$ so that at this time the material from the second hopper is being directed into the mixing chamber. It will thus be obvious that through this alternative method of valve operation the feeding of materials from the two hoppers is alternatively performed, one or more of the valves as shown at 81, 82 being employed for this purpose.

In Fig. 11, the valve shown at 91 is intended to diagrammatically illustrate the operation of the group of valves used for supplying air under pressure through the air pipes 41 and 50 and therefrom through the air passages 40 in dome 32. In the view D the valve is shown directing air into the pipe 50 while the supply to pipe 41 is shut off. In view E the valve is completely open, the air being supplied to both pipes 50 and 41; in view F the air is being supplied to pipe 41 only, and in view G the supply of air to both pipes 41 and 50 is completely cut off. The cycle of valve operation begins as indicated in view E where the valve is fully open to supply air through both pipes 41 and 50. Next the flow to one of the pipes is shut off, then the flow to the other is shut off while the flow to the first is opened. Then the flow to both pipes is completely shut off and then the cycle begins again by the full opening of the valve as shown in view E.

By the arrangement of valve operation above described, great flexibility of operation of the improved mixing device is attained. The control of air flow; the amount of air directed into the mixing chamber; the periodicity of flow of the air, the direction of air flow within the chamber are all features which co-operate in the attainment of satisfactory mixing of different materials.

Briefly, the operation of the device is as follows:

Both hoppers 16 and 17 are filled with the materials to be mixed and motor 60 is set in operation. Shafts 4 rotate the feed discs 7 so that the same carry material in their apertures 19 to positions in registration with the air feed pipes 21. Alternate operation of valves 81 and 82 feeds the materials first from one hopper and then from the second into the mixing chamber by flow of air under pressure through pipes 21. Air under pressure, forced through the annular passages 40 in the dome of the mixing chamber and out of the angular holes 45 in said passages, as well as the air flow which transports the materials into the mixing chamber, swirls the materials about within the mixing chamber to thoroughly mix the same. The mixed material falls down through the annular space between the opening 31 and the outlet tube 35, the air rising up, through and out of the exhaust pipe 37.

What I claim is:

1. In a mixing machine, a mixing chamber having a base, a domed top detachably secured to said base, the wall of said top having spaced and independent annular passages extending through it, the walls of said passages having angular holes establishing communication between the passages and the interior of the dome, the holes in one of said passages extending in a direction forwardly around the dome and those in the other passage extending in a reverse direction around the dome, means for feeding materials into the dome to be mixed, and means for supplying air under pressure first through one of the passages and then through a second passage and holes therein into the interior of the mixing chamber to mix the materials delivered into the mixing chamber.

2. In a mixing machine, a mixing chamber including an annular base provided with a central aperture, a domed top removably fitted over said base and provided with a central sleeve, the lower end of said sleeve being disposed within the aperture in the base and of less diameter than said aperture, the wall of said domed top being formed with a plurality of spaced, superposed independent annular unconnected air passages, each of said passages extending completely around the dome and being formed with a plurality of angularly disposed holes, the holes in some of said passages being directed at an angle forwardly around the dome and in a direction opposite to those in other of the passages, the holes in each passage establishing communication between the passage in which they are formed and the interior of the dome, means for successively forcing air under pressure through said passages, and means for delivering material into the chamber to be mixed by the action of air streams emanating from the holes in the passages.

3. In a mixing machine, a mixing chamber having a base member, a dome fitted thereover, said dome being provided with several independent annular passages extending around it, a source of air under pressure connected to each of said passages, each passage having a series of angularly disposed holes extending through it from the interior of the passage to the interior of the mixing chamber, automatic valve means for automatically controlling the flow of air under pressure first through all of the passages simultaneously and then through the several passages separately, and means for supplying materials to be mixed into the interior of the mixing chamber.

4. In a mixing machine, a mixing chamber having a base portion, a domed top fitted thereover, said domed top being formed with a plurality of separate and annular passages extending completely around it, the base portion having a curved surface directed toward the interior of the domed top, the annular passages each having a plurality of holes directed toward the curved surface of the base portion, said holes establishing communication between the interior of the passage in which they are formed and the interior of the domed top, the holes in at least one of said passages being inclined at an angle and in a reverse direction to those in the other passages, means for supplying air under pressure first through one of the passages and holes therein, and then through the next passage and means for delivering material to be mixed into the interior of the mixing chamber.

5. In a mixing machine, a mixing chamber having a base member, a dome fitted thereover, said dome being formed with a plurality of spaced independent and unconnected annular passages extending around it, each of said annular passages being provided with a plurality of holes extending through it from the interior of the passage to the interior of the mixing chamber, some of said holes being disposed angularly to others whereby streams of air will be directed therethrough in opposite directions, and valve means for automatically controlling the flow of air under pressure through either one or the other or all of said passages.

6. In a mixing machine, a pair of hoppers, a mixing chamber, means for forcing material into said chamber first from one hopper, and then from the other, a domed top on said chamber, said top being formed with several annular air passages, means for forcing air under pressure first through one of said passages and then through the other and then through the several passages simultaneously, the passages having holes establishing communication between said passages and the interior of the mixing chamber.

7. In a mixing machine, several hoppers from which materials to be mixed are fed, a mixing chamber into which said materials are delivered from the hoppers, means for alternately delivering hopper contents into the mixing chamber, the mixing chamber having several air passages communicating with its interior, means for forcing air under pressure alternately through said air passages, and a single driving means for actuating the alternate material-feeding means and the alternate air-supply means.

8. In a mixing machine, a mixing chamber, means for delivering material to be mixed into said chamber, a removable domed top on said chamber, said top being provided with several independent air passages, means for automatically forcing air under pressure first through one of said passages and then through the other, the passages having holes establishing communication between said passages and the interior of the mixing chamber, the holes in the separate passages extending in opposite directions.

9. In a mixing machine, a mixing chamber, means for delivering material to be mixed into said chamber, a removable domed top on said chamber, said top being provided with at least two independent air passages, means for automatically forcing air under pressure first through one of said passages and then through the other, one of the passages having holes extending downwardly and angularly around the chamber to thereby cause air to be directed in one direction downwardly and forwardly around the chamber, the other passage having holes extending downwardly and angularly around the chamber in an opposite direction, whereby materials delivered into the chamber may be first swirled around the chamber in one direction for a predetermined period of air streams emanating from the holes leading from one passage and then swirled in an opposite direction for a predetermined period from air streams emanating from the holes in the second passage.

SAMU-EL ISH-SHALOM.